United States Patent [19]
Kravitz

[11] Patent Number: 5,265,896
[45] Date of Patent: Nov. 30, 1993

[54] VEHICLE STEP KIT AND METHOD

[76] Inventor: Harley A. Kravitz, 3041 Brainard Rd., Pepper Pike, Ohio 44124

[21] Appl. No.: 801,039

[22] Filed: Dec. 3, 1991

[51] Int. Cl.$^5$ .............................................. B60R 3/00
[52] U.S. Cl. ...................................... 280/163; 182/92
[58] Field of Search .................... 280/163, 169, 164.1; 403/293; D12/203; 182/92; 296/71, 152, 157

[56] References Cited

U.S. PATENT DOCUMENTS

| | | | |
|---|---|---|---|
| D. 292,388 | 10/1987 | Weiler | D12/203 |
| D. 293,667 | 1/1988 | Weiler | D12/203 |
| 3,758,134 | 9/1973 | Stewart | 280/163 |
| 4,203,611 | 5/1980 | Makela | 280/163 |
| 4,451,063 | 5/1984 | Snyder | 280/163 |
| 4,935,638 | 6/1990 | Straka | 280/163 |
| 4,943,085 | 7/1990 | Straka | 280/163 |

OTHER PUBLICATIONS

Advertisement for a universal vehicle step plate & mounting instructions, Copyright date 1988.
Atlantic MH & RV Suppliers Corp. 1989 Parts Catalog.
Blevins Parts & Accessories for RV's 1989.

*Primary Examiner*—Richard M. Camby
*Attorney, Agent, or Firm*—Watts, Hoffmann, Fisher & Heinke Co.

[57] ABSTRACT

A retrofit, motor vehicle step kit which easily mounts to a motor vehicle regardless of the motor vehicle's make and model. The step kit comprises a step body, two L-shaped brackets, two stiffening members and four nuts. The kit further includes three bolts for connecting the step body to a motor vehicle body and three adaptor brackets for use with trucks having a model year of 1991 or later. A first section of each L-shaped bracket is attached to a motor vehicle frame while a second section of each bracket engages an associated one of the stiffening members. A first of the end portions of each stiffening member engages its associated one of the brackets while a second of the end portions is connected to a support receptacle of the step body. Once the brackets are properly connected to the motor vehicle frame, the effective length of the stiffening members are adjusted with the nuts to level the step body and the step body is connected to the motor vehicle body, thereby allowing the step to support the weight of a person.

12 Claims, 5 Drawing Sheets

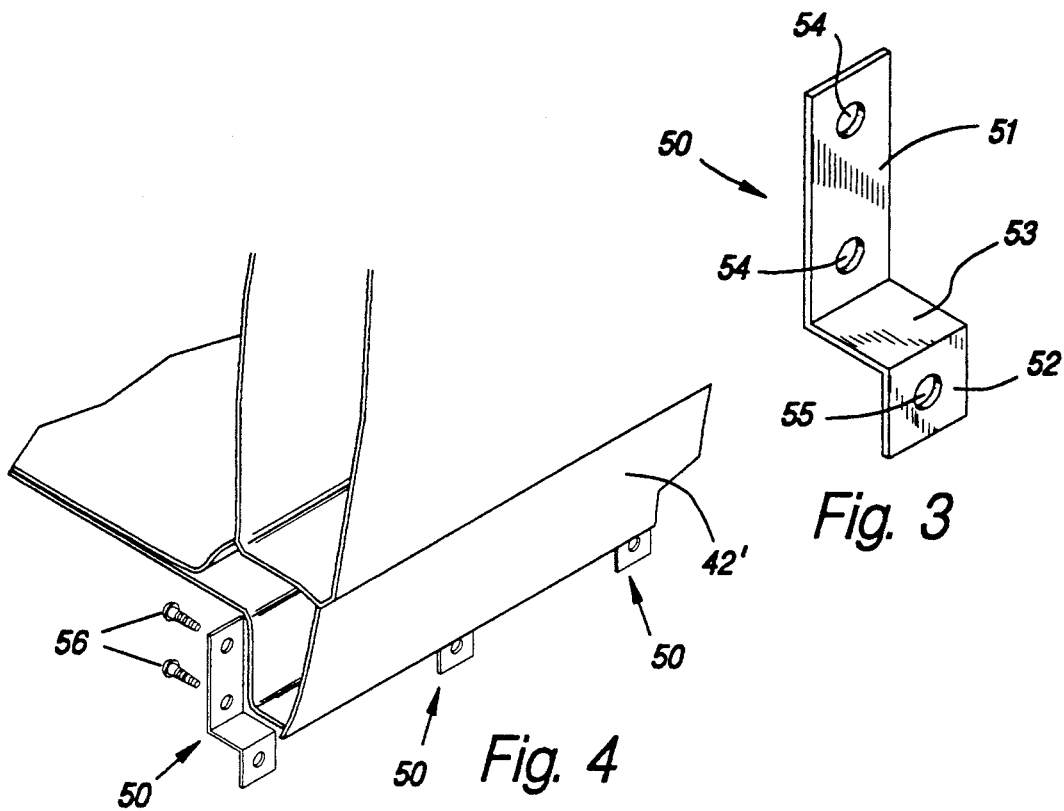
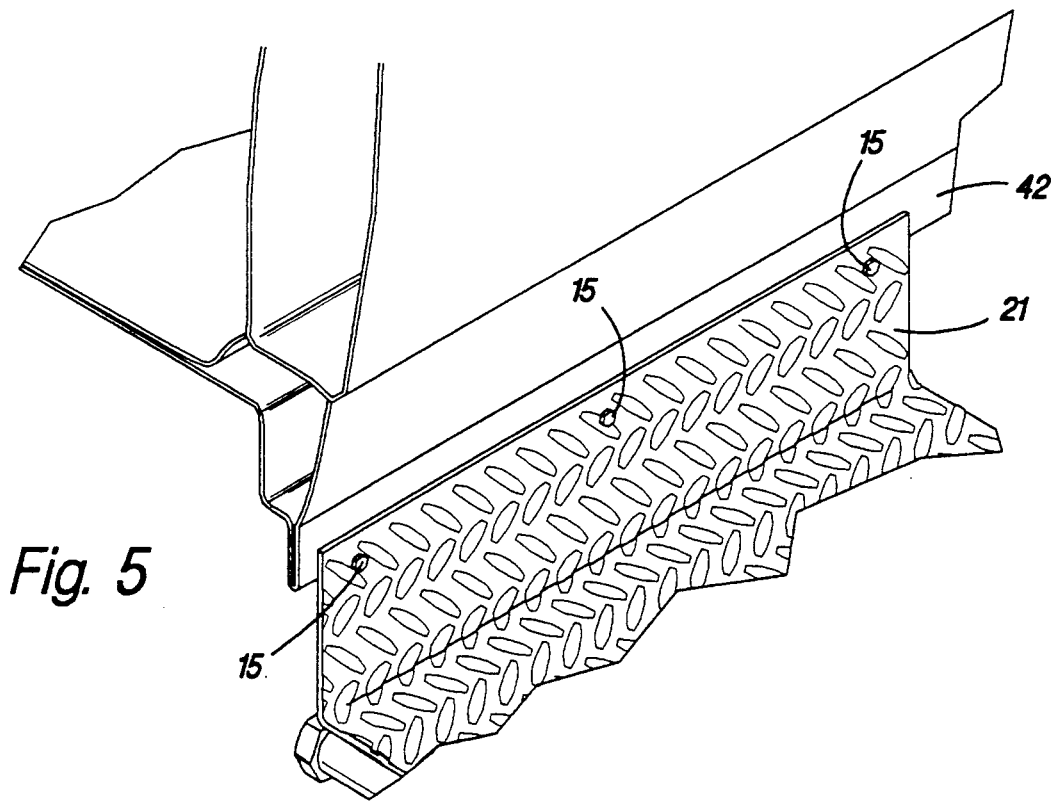

VEHICLE STEP KIT AND METHOD

TECHNICAL FIELD

This invention relates to a vehicle step or running board, and more specifically, to a retrofit kit for adding the step or running board to a vehicle of a given class after manufacture of the vehicle and regardless of the manufacturer of the vehicle.

BACKGROUND

Motor vehicles, especially of the sport and utility class which includes pick-up trucks and recreational vehicles, often have retrofit, auxiliary steps or running boards mounted below lower portions of a vehicle body, usually referred to as rocker panels. Such steps add to the vehicle's appearance and also make it easier to enter the vehicle. They also minimize the damage caused by rocks and other road debris which are thrown up at the vehicle body from the vehicle's tires by blocking many such rocks and debris before they can hit the vehicle body.

Most, if not all, vehicles of the class are not manufactured with such auxiliary running boards. Because motor vehicles vary in both body and frame dimensions from manufacturer to manufacturer and model to model, if a vehicle owner wants to add a running board at a later date, he must find one which fits the specific model of vehicle which he owns.

Heretofore kits for retrofitting steps to sport and utility vehicles have been intended for use only on vehicles of substantially identical construction. This means auto accessory manufacturers and merchants must maintain inventories of a variety of kits each to fit only like types and brands of vehicles. This creates large inventories and corresponding capital investments in an era when the emphasis is on inventory reduction.

SUMMARY OF THE INVENTION

A universal-fit motor vehicle step embodying the present invention for retrofitted attachment to a motor vehicle comprises a step body which is L-shaped in cross-section, at least two L-shaped brackets, and at least two stiffening members of adjustable effective length for connecting the body to the brackets. The brackets are invertible and each has a plurality of holes along a vertical section of each bracket.

A horizontal or leg section of each bracket is to be attached to a motor vehicle frame while the vertical section of each bracket is to engage an associated one of the stiffening members. One end portion of each stiffening member engages its associated one of the brackets while the other end portion is connected to a support receptacle of the step body. Connection structure for connecting the step body to the underside of a motor vehicle body is also provided. Once the brackets are properly connected to the motor vehicle and the step body is connected to the motor vehicle body, the effective lengths of the stiffening members are adjusted by rotating nuts threaded on the stiffening members. This adjustment levels the step body, thereby allowing the step better to support the weight of a person and to provide a good appearance.

By properly mounting the brackets and stiffening members, and adjusting the effective length of the stiffening members, the step can be mounted on virtually any motor vehicle of the sports and utility class regardless of make and model. The brackets can be connected to a vehicle frame and the effective length of the stiffening members adjusted such that the kit can be mounted on different vehicles even though their frames are laterally offset varying distances from sides of their bodies. If the motor vehicle has a unitized body, the kit can be mounted by appropriately connecting the brackets to the vehicle's underside. In all cases, the brackets and stiffening members align the step body with the vehicle body for a secure and attractive connection between the step body and vehicle body.

By providing a step which can be mounted to virtually any motor vehicle of the class, manufacturers and merchants no longer need carry inventories of steps which fit specific motor vehicles. The only step kit which need be kept in inventory is one which embodies the present invention.

Accordingly, the object of the present invention is to provide a universal-fit motor vehicle step or running board for retrofitted attachment to a motor vehicle of the relevant class regardless of the manufacturer of the motor vehicle. The above and other features of the invention will be better understood from the detailed description that follows, when considered in connection with the accompanying drawings.

BRIEF DESCRIPTION OF THE DRAWINGS

FIG. 3 is a perspective view of an adaptor bracket included with the vehicle step kit for use with certain vehicles;

FIG. 4 is a perspective view of two adaptor brackets mounted on a vehicle, an exploded view of a third bracket positioned for such mounting;

FIG. 5 is an enlarged perspective view of the step body attached to a vehicle rocker panel; and, FIG. 6 is a perspective view of the vehicle step kit mounted on a vehicle.

DESCRIPTION OF THE PREFERRED EMBODIMENT

Figure 1:
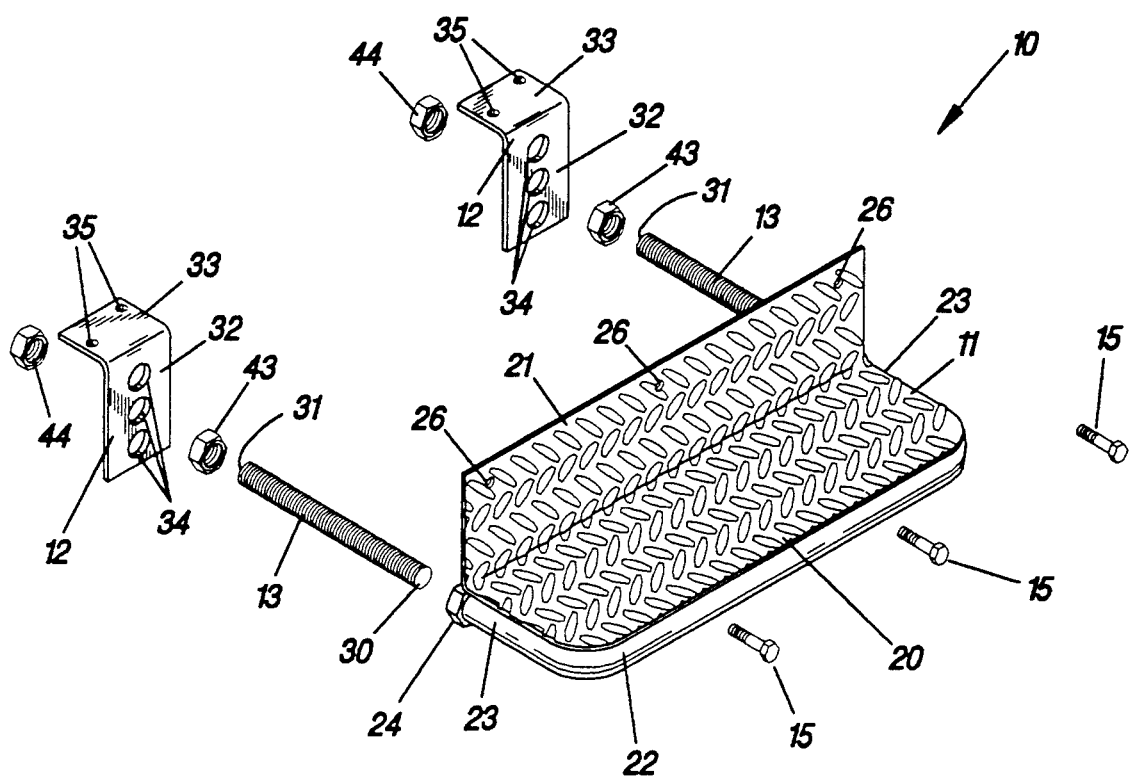
FIGS. 1 and 1a are exploded views of the preferred embodiment of a vehicle step kit.

Turning to the drawings, a motor vehicle step kit 10 is illustrated. The motor vehicle step 10 comprises a step body 11, two L-shaped brackets 12, two stiffening members 13, four nuts 43, 44 and three bolts 15 for connecting the step body 11 to a motor vehicle body.

The step body 11 is L-shaped in cross section and has a horizontal lower step portion 20 and a vertical upper support section 21. The step body 11 is made with embossed metal so that a front surface of both the lower and upper sections 20, 21 has embossed lugs to inhibit slippage when stepped upon.

The lower section 20 of the step body 11 has a support tube 22 which is positioned below a front, outer edge part of the step portion. The tube 22 is an elongated U-shape and is connected to the step body 11 along a bottom surface of the step portion 20.

At each end 23 of the tube 22 is an attached nut 24. Each nut 24 adapts the tube 22 to engage a corresponding one of the stiffening members 13.

Along a top edge portion 25 of the upper section 21 are three holes 26.

The stiffening members 13 are threaded and are essentially studs. When the kit 10 is mounted to a motor vehicle, one end portion 30 of each member 13 is threaded into its corresponding nut 24 of the tube 22 and a second end portion 31 is connected to a corresponding bracket 12.

The brackets 12 are L-shaped in cross section and each has a vertical section or arm 32 and a horizontal section or leg 33 which is shorter than the arm 32. Each arm 32 has three apertures 34 arranged vertically while each leg 33 has two apertures 35 arranged substantially diagonally.

Figure 6:
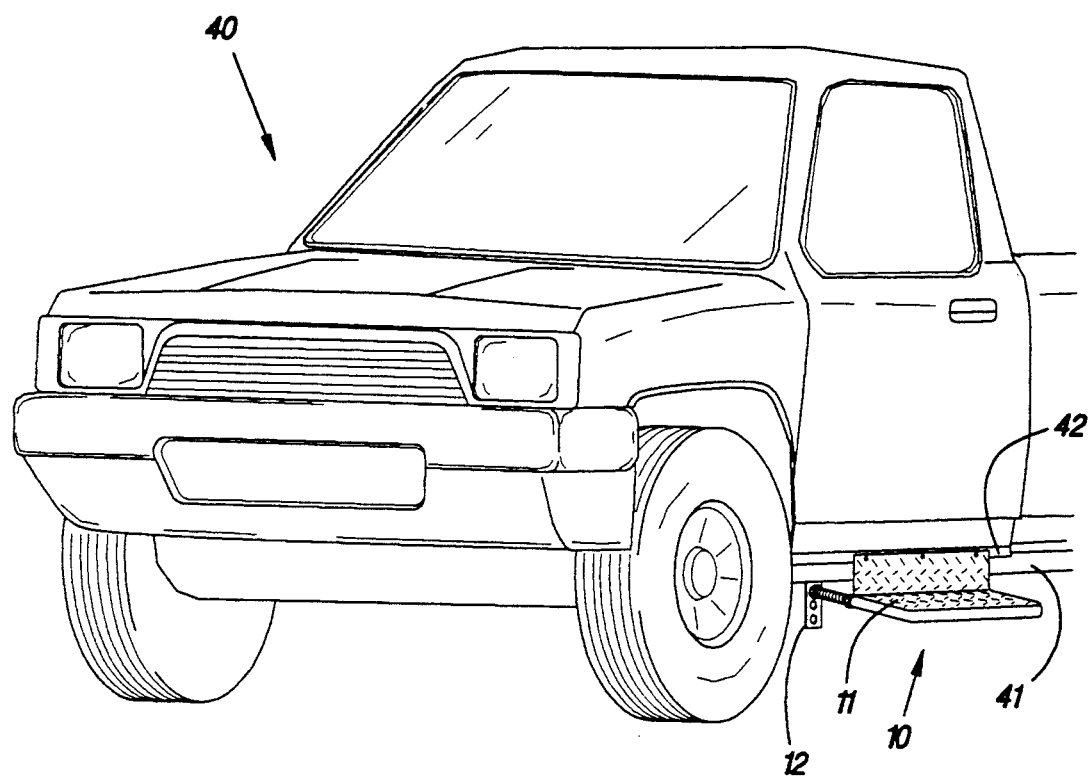

Turning to FIGS. 5 and 6, the step kit is shown mounted on a motor vehicle 40. The brackets 12 are mounted on a motor vehicle frame 41 via the legs 33. If the motor vehicle has a unitized body and frame, the brackets are connected to the vehicle's underside. Screws or any other suitable fastener can be used. The brackets 12 are spaced an appropriate distance apart to accommodate the length of the step body 11.

The upper section 21 of the step body 11 is connected to a motor vehicle body portion 42, commonly referred to as a rocker panel flange, via bolts 15. Each bolt 15 is mounted through its corresponding hole 26.

The step body 11 is securely attached to the rocker panel flange 42 and each stiffening member 13 is inserted through an appropriate one of the apertures 34 in its corresponding bracket and is threaded into its corresponding nut 24 on the tube 22. The appropriate aperture 34 is determined based on the location of the rocker panel flange 42 relative to the frame 41 so that the stiffening members 13 level the step section 20 of the step body 11.

A nut 43 is threaded onto each stiffening member 13 prior to engaging the nut 24. Each nut 43 is adjusted against its corresponding bracket 12 until the step section 20 is horizontal. A second nut 44 is tightened along the outer end portion 31 of each stiffening member 13 until it tightly engages its corresponding bracket 12 to securely hold in place each stiffening member 13 and thereby the step body 11. The tightening of the nuts 43, 44 with their corresponding bracket 12 located between them locks the nuts 43, 44 in place and thereby inhibits the nuts 43, 44 from becoming loose. This, in turn, prevents rotation of the corresponding stiffening member 13 which prevents the stiffening member 13 from loosening with respect to nut 24.

Figure 1A:
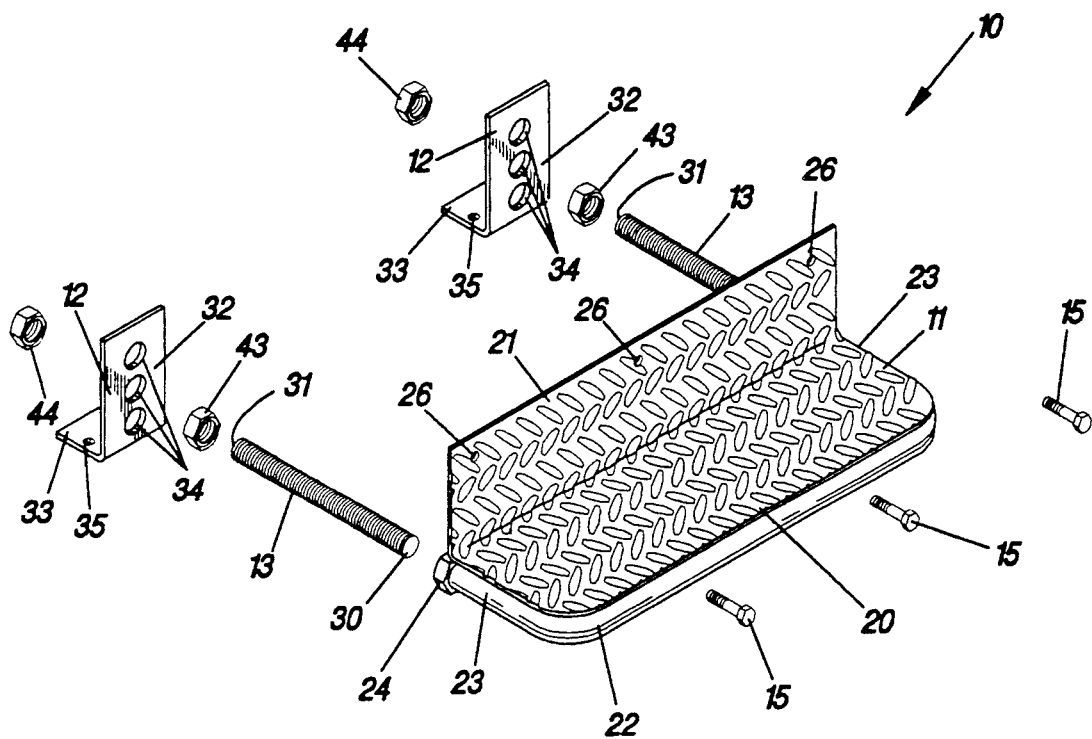
Figure 2:
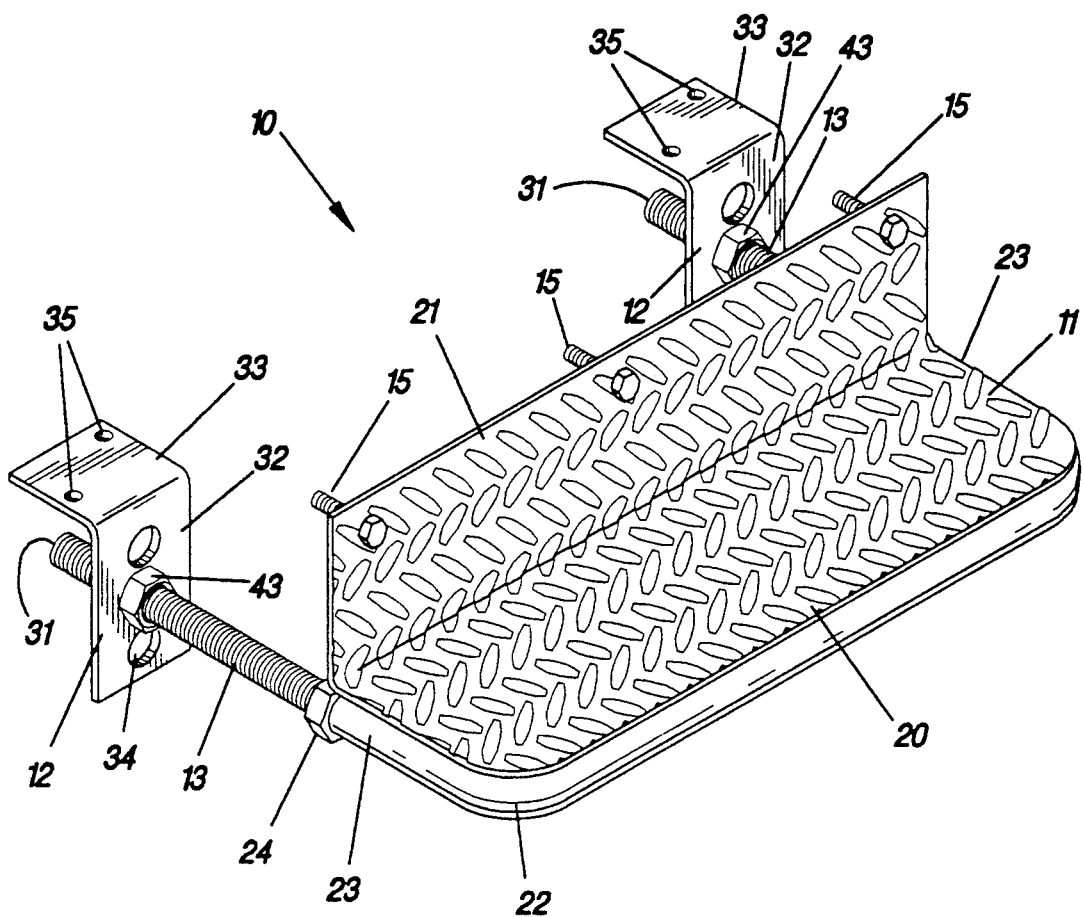
FIG. 2 is a perspective view of the preferred embodiment of the vehicle step kit assembled.

As can be seen from the above description, the make and model of the motor vehicle 40 is virtually irrelevant. The effective length of the stiffening members 13 is adjusted by the use of the nuts 43, 44 so that the stiffening members can adapt to the horizontal distance between the frame 41 and the rocker panel 42. In addition, the vertical distance between the rocker panel 42 and the frame 41 where the brackets 12 are mounted is adapted to with the three apertures 34 of the L-shape of the brackets 12. If needed, the brackets 12 can be inverted as shown in FIG. 1a in order to adapt to the vertical distance between the rocker panel 42 and the frame 41.

As thus far described, the vehicle must be equipped with the rocker panel flanges 42 so that the vertical upper section 21 can be mounted on them. However, many of today's newer motor vehicles (more specifically, 1991 and later model trucks), do not have such flanges depending from their rocker panels.

For such newer motor vehicles or similar but older motor vehicles, the kit 10 also includes three adaptor brackets 50 of the type illustrated in FIG. 3. Each adaptor bracket 50 comprises an upper vertical portion 51 and an offset lower vertical portion 52 spaced by an intermediate connecting portion 53. The upper vertical portion 51 includes two holes 54. The lower vertical portion 52 has one hole 55.

By mounting the adaptor brackets on an inner side of the rocker panel 42' with two screws or other suitable fasteners 56 as illustrated in FIG. 4, the vertical upper section 21 of the step body 11 can be mounted on the lower vertical portions 52 with bolts 15. The L-shaped brackets 12 and stiffening members 13 are mounted as previously described. The use of the adaptor brackets 50 thereby allows the step kit 10 to be utilized with motor vehicles which do not have depending rocker panel flanges 42.

Although the preferred embodiment of this invention has been shown and described, it should be understood that various modifications may be made without departing from the scope of the invention as disclosed and claimed herein.

I claim:

1. A motor vehicle running board kit for retrofitted attachment of a running board to a vehicle comprising:
    a) a pair of L-shaped brackets;
    b) each bracket having a leg adapted to be connected to a vehicle frame structure and an apertured arm extending from the leg selectively either upwardly or downwardly when in use;
    c) an elongated running board of generally L-shaped cross section, the board including an elongate step section and an upstanding support section including portions adapted to be connected to a rocker panel section of such vehicle; and,
    d) at least two elongate stiffening elements including means for adjusting their effective length and for connection to and positioning between the brackets and the running board and thereafter being adjustable in effective length to adjust the position of the running board relative to the vehicle to a level orientation.

2. The running board kit of claim 1 further comprising a plurality of adaptor brackets for connecting the running board to a body of such motor vehicle.

3. The running board kit of claim 1 wherein the stiffening elements comprise threaded members each of which is connected to one of the brackets with nuts and is also connected to a portion of the running board.

4. A method of retrofitting a running board to a motor vehicle comprising:
    a) connecting an upstanding section of an elongate running board to a rocker panel section of the vehicle;
    b) determining whether arms of a pair of L-shaped brackets will be oriented in upstanding or depending relationship to or from legs of the pair of brackets;
    c) connecting the legs to the vehicle inwardly of such rocker panel with the arms of the brackets positioned substantially vertically in the determined orientation and arm apertures transversely aligned with connection parts of the board;
    d) projecting each of a pair of stiffening elements through a corresponding one of the aligned apertures;
    e) respectively connecting each of the stiffening elements to an associated one of the connection parts; and,
    f) thereafter adjusting the effective length of the stiffening elements until a step section of the connected running board is at a desired attitude relative to the vehicle.

5. A motor vehicle comprising:
a) a frame;
b) a body connected to the frame and including a rocker panel section; and,
c) a retrofitted elongated running board attached to the frame and the body comprising:
 i) a pair of L-shaped brackets;
 ii) each bracket having a leg adapted to be connected to the frame and an apertured arm extending from the leg in a selected one of upward and downward orientations;
 iii) the elongated board being of generally L-shaped cross section, the board including an elongate step section and an upstanding support section including portions connected to the rocker panel section; and,
 iv) at least two elongate stiffening elements including means for adjusting their effective length and for connection to and positioning between the brackets and the running board body and being adjustable to an effective length appropriate to provide a desired angular attitude relative to the frame.

6. The motor vehicle of claim 5 wherein the retrofitted running board further comprises three adaptor brackets for connecting the running board to the motor vehicle body.

7. The motor vehicle of claim 5 wherein the stiffening elements comprise threaded members which are connected to the brackets with nuts and threaded into threaded portions of the step body.

8. A universal-fit, motor vehicle step comprising:
a. a step body which is L-shaped in cross-section;
b. at least two L-shaped brackets, a first section of each bracket being adapted to be attached to a motor vehicle underside, a second section of the brackets having a front side and a back side and having a plurality of apertures;
c. at least four nuts, a nut being placed on each side of each of the second sections of the brackets;
d. at least two members each having two threaded portions for connecting the body to the brackets, a first of the threaded portions of each member engaging an associated one of the brackets and its corresponding nuts, a second of the threaded portions being connected to a portion of the step body, the threaded portions having threads extending a sufficient distance there along to align the step body with a motor vehicle body when the nuts are appropriately tightened along the threaded members;
e. connection means for connecting the step body to the motor vehicle body.

9. The motor vehicle step of claim 8 wherein the connection means comprises a set of nuts and bolts.

10. The motor vehicle step of claim 8 further comprising at least two adaptor brackets for connecting the step body to the motor vehicle body.

11. A universal-fit, motor vehicle step kit for mounting to various motor vehicles of different motor vehicle manufacturers comprising:
a. a step body which is L-shaped in cross section;
b. at least two L-shaped brackets, a first section of the brackets being adapted to be attached to a motor vehicle underside, a second section of the brackets having a front side and a back side and having a plurality of apertures;
c. at least four nuts, a nut being placed on each side of each of the second sections of the brackets;
d. at least two members each having two threaded portions for connecting the body to the brackets, a first of the threaded portions of each member engaging an associated one of the brackets and its corresponding nuts, a second of the threaded portions being connected to a portion of the step body, the threaded portions having threads extending a sufficient distance there along the threaded portions to align the step body with a motor vehicle body when the nuts are appropriately tightened along the threaded portions such that the step body can be connected to the vehicle body;
e. at least three adaptor brackets for interfacing between the step body and the motor vehicle body; and,
f. at least three nuts and bolts for connecting the step body to the tubes and the rectangular members and thereby to the motor vehicle body.

12. For use with a motor vehicle having a frame structure and a body structure including a rocker panel, a running board kit for attachment to the motor vehicle comprising:
a) at least two brackets, each bracket being adapted to be connected to the vehicle frame structure and including at least two apertures;
b) an elongated running board of generally L-shaped cross section, the board including an elongate step section and an upstanding support section including portions adapted to be connected to the rocker panel section of the vehicle; and,
c) at least two elongate stiffening elements including means for adjusting the effective length of the elements and for connection to and positioning between the brackets and the running board and thereafter being adjusted in effective length to adjust the angular attitude of the running board relative to the vehicle.

* * * * *